Oct. 14, 1969   G. H. DANIELS ET AL   3,472,383
VACUUM DRUM FILTER

Filed May 29, 1967   2 Sheets-Sheet 1

PETER M. WECHSELBLATT
GEORGE H. DANIELS
INVENTORS.

BY J. T. Chabot
AGENT

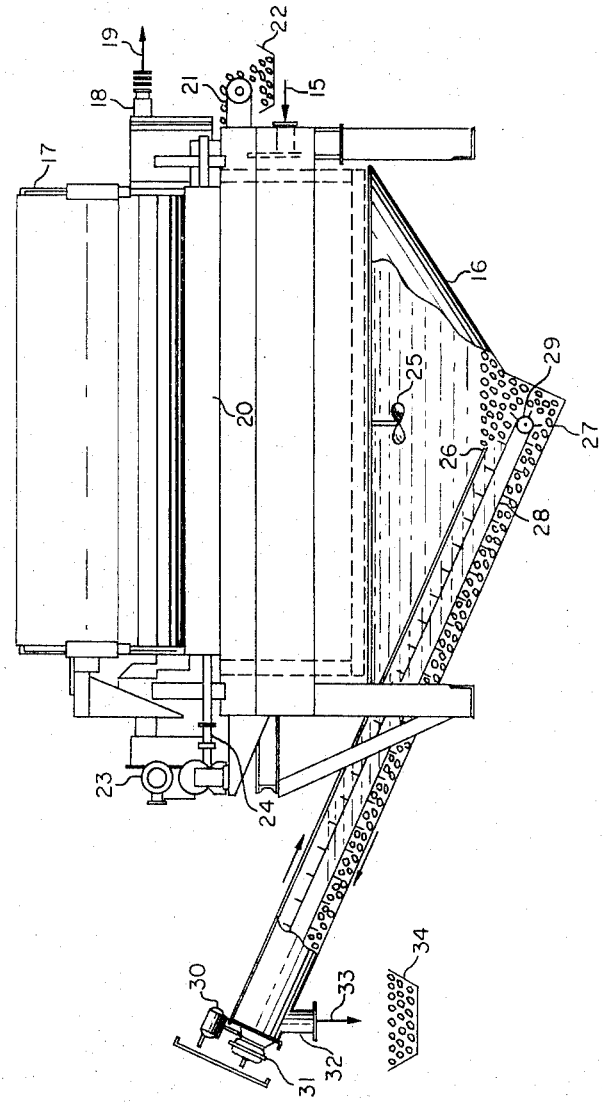

3,472,383
VACUUM DRUM FILTER
George H. Daniels, Wilmington, Del., and Peter M. Wechselblatt, New York, N.Y., assignors to Chemical Construction Corporation, New York, N.Y., a corporation of Delaware
Filed May 29, 1967, Ser. No. 642,054
Int. Cl. B01d 33/36, 33/06
U.S. Cl. 210—297                         3 Claims

ABSTRACT OF THE DISCLOSURE

The plugging and resultant periodic shutdown of a vacuum filter due to buildup of accumulated coarse solid particles in the bottom of the filter or the filter pan is prevented by providing a sloping lower container below the filter. The container has a bottom opening from which an inclined trough extends upwards to a coarse solids outlet above the level of liquid in the container. Displacement means such as a rotating screw conveyor or drag chain are provided in the trough, to move settled coarse solids upwards through the trough from the bottom opening in the container, thereby dewatering the coarse solids. The solids are moved to an upper discharge outlet from the trough to means for disposal of wet coarse solids.

BACKGROUND OF THE INVENTION

Field of the invention

The invention is directed to an improvement in vacuum filters such as rotary drum filters, in which a slurry containing relatively coarse as well as fine solid particles is passed to the filter, and the coarser solid particles tend to settle and accumulate in the filter rather than being discharged with the filter cake, thus necessitating frequent or periodic shutdowns of the filter for the manual removal of accumulated solids.

Description of the prior art

In many instances, the feed slurry to a rotary drum filter or other type of vacuum filter is put through a primary classification step upon entering the thickener, to remove larger solid particles. However, in most instances, the particulates in the slurry reaching the filter tend to have a relatively large size distribution range, including coarser as well as fine particles. The oversize particulates tend to fall in the filter pan below the drum or other filtration surface, and the agitator supplied in the pan cannot keep these particles from settling. Within a short period of time, the pan plugs up with solids and the filter must be shut down for cleaning. Generally, this disrupts the entire treatment system since it now becomes impossible to pump sludge out of the thickener.

Prior art references dealing with vacuum filtration or the selective removal of solids from liquids include U.S. Patents Nos. 2,312,075; 2,705,562; 2,283,992 and 2,572,236.

Summary of the invention

The present invention relates to an improvement in a vacuum filtering apparatus for the filtration of a liquid phase from a liquid slurry containing coarse and fine entrained solid particles. An apparatus combination is provided which effectively removes settled coarse solid particles from the bottom of the filtration apparatus, while permitting continuous operation of the filtration process. In the present invention, a sloping container such as a filter pan is provided below the filter. The sloping filter pan or container is a holding basin for slurry feed to the filter and is sloped in shape to a lower bottom point. At the bottom of this basin a dewatering screw or drag chain or other method for removing settled solids is mounted. All of the sludge or slurry derived from prior process units such as a thickener contains entrained solids, which either remain in suspension or settle to the bottom of the filter pan. The generally coarser or larger solid particles will have a greater tendency to settle to the bottom of the filter pan, and these solids which settle are removed through a bottom opening in the filter pan by means of the lower screw conveyor or drag chain. Those solids which remain in suspension are removed from the vacuum filter as a filter cake. Thus, it no longer becomes necessary or mandatory to make a complete or fine classification in prior processing units as a thickener, and with the arrangement of the present invention the filter pan can never shut the system down by plugging. An agitator will preferably be provided in the filter pan, to push bridging solids into the screw or chain mechanism. The slope of the bottom of the pan is fixed at a sufficient angle to prevent the buildup of solids along the walls. In addition, the agitator travel or path could be designed to skim the walls of solids.

The apparatus of the present invention provides several important advantages. The buildup of settled solids in the bottom of the vacuum filter apparatus is effectively prevented, and thus it is no longer necessary to periodically shut down the filter for cleanout or removal of settled solids. The apparatus of the present invention is relatively simple to fabricate and install, and thus the invention may be applied to existing installations as well as new facilities. Since settled solids are completely removed, it is no longer necessary to provide a preliminary classification for solids removal in auxiliary apparatus such as a cyclonic classifier, and thus such auxiliary apparatus is no longer required in new installations.

It is an object of the present invention to provide an improved vacuum filtration apparatus.

Another object is to provide an improved apparatus for filtering slurries and sludges which contain entrained solid particles which have a tendencey to settle out of suspension in the liquid phase.

A further object is to provide a vacuum filtration apparatus in which periodic shutdown of the apparatus to remove accumulated or settled solids is prevented.

An additional object is to remove settled solids particles from the bottom of a vacuum filtration apparatus such as a drum filter in an improved manner.

These and other objects and advantages of the present invention will become evident from the description which follows.

DESCRIPTION OF THE DRAWINGS AND PREFERRED EMBODIMENTS

Referring to the drawings,

FIGURE 2 is a sectional elevation view of an alternative embodiment of the invention.

Figure 1:
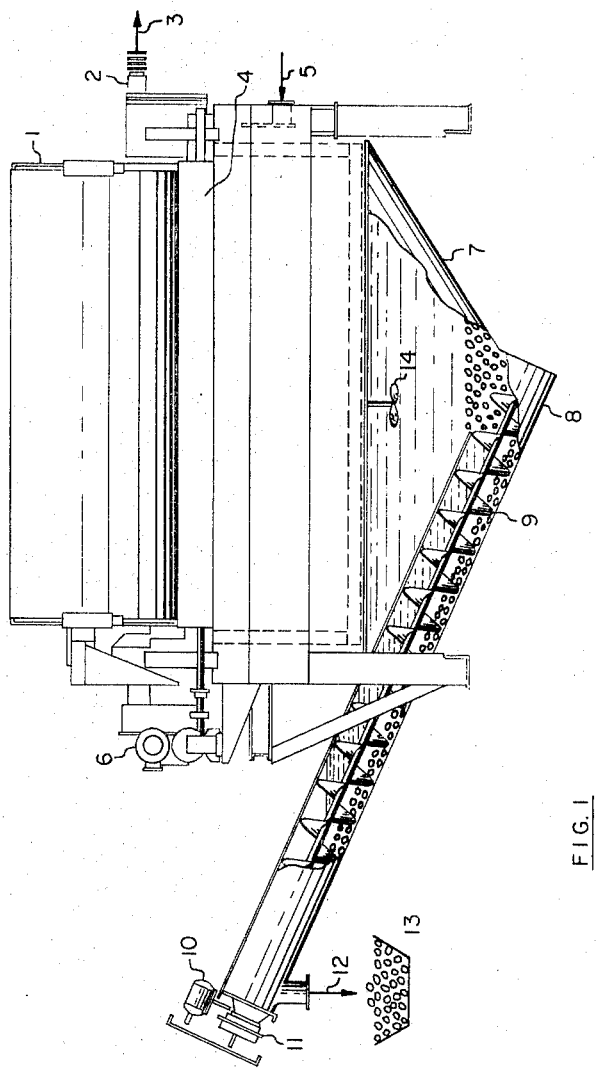
FIGURE 1 is a sectional elevation view of one embodiment of the invention.

Referring now to FIGURE 1, the invention is illustrated as applied to a rotary drum vacuum filter, which is provided with rotating filter drum 1. A vacuum effect is applied via outlet 2, which extends to vacuum generating means, not shown. The vacuum effect applied via outlet 2 serves to draw off stream 3 which principally consists of clear filtered liquid. Filter cake is drawn off from the rotating drum by scraper blade 4, which passes the filter cake to a discharge belt. A feed liquid slurry or sludge stream 5 is passed into the lower part of the filter unit, generally below the rotating drum 1, which is rotated by the drive motor 6. The motor 6 is connected by suitable gearing to drum 1, and may also drive the filter cake discharge belt. The container 7, usually consisting of a filter pan, is disposed about the lower part of the filter unit, and stream 5 will usually be passed into the upper part of container 7. Since container 7 is provided with a sloping bottom, the generally coarser or heavy solid particles present in stream 5 tend to settle in the lower central or bottom portion of container or pan 7, and pass through a bottom opening provided in pan 7 and into the lower end of inclined trough 8. The trough 8 extends angularly upwards from the bottom opening in the filter container or pan 7 and terminates above the liquid level in pan 7, so that the liquid phase in trough 8 terminates below the upper end of the trough 8. A rotating screw conveyor 9 is disposed in trough 8, and is driven by motor 10 which extends to gear drive unit 11. The settled solids which pass into the lower end of trough 8 from the opening in pan 7 are moved or displaced upwards within trough 8 by screw 9 to an upper outlet above the level of liquid in trough 8, and wet solids stream 12 is discharged from the upper end of trough 8 into receptacle or vessel 13, from which the wet solids are passed to disposal, usually together with the filter cake removed via scraper blade 4.

The trough 8 will usually be juxtaposed adjacent to the lower sloping section or bottom of pan 7, however in instances when the quantity or weight of solids removed via stream 12 is relatively great, the trough 8 may be provided with a more gradual slope or be disposed at a slight acute angle relative to the horizontal. In all instances, the outlet of stream 12 from trough 8 will be above the level of liquid in the trough 8 and pan 7, so as to prevent the carryover of liquid into vessel 13. An internal rotating agitator 14 will preferably be disposed in pan 7, with the agitator 14 rotating within the liquid phase in pan 7, so as to prevent the accumulated deposition or bridging of solids along the sloping walls of pan 7. In some instances, the agitator 14 will be disposed to travel or skim along the walls of pan 7, so as to displace solids downwards to the bottom opening in the pan 7.

Referring now to FIGURE 2, an alternative embodiment of the invention is illustrated, in which alternative means are provided to displace settled coarse solid particles upwards through the trough from the bottom opening in the filter pan. The liquid slurry or sludge stream 15, containing coarse and fine and entrained solid particles, is passed into the vacuum drum filter unit above or in the uper part of filter pan 16, and below the rotating vacuum drum 17. A vacum effect is maintained on drum 17 by vacuum outlet 18, from which the clear filtered liquid phase is removed via stream 19. The filter cake consisting of fine solids which is deposited on drum 17 by the filter action, is removed via scraper blade or knife-edge 20, and is passed to drum belt 21, from which the solid filter cake passes to disposal vessel 22. Motor 23 is connected by shaft 24 to the drive gears of the filter units such as drum 17 and belt 21.

Returning to pan 16, the liquid slurry stream 15 flowing into the upper portion of the pan 16 is stirred and agitated by agitator 25, so that a portion of the entrained solid particles in slurry 15 consisting of generally coarser or denser solid particles settles towards the bottom of pan 16. The pan 16 is provided with sloping side walls, so that the coarser solid particles settle downwards to bottom opening 26 for removal from the filter unit. An inclined trough 27 is disposed with an opening at its lower end extending from opening 26, and the trough 27 extends angularly upwards from opening 26 to an upper terminus above the liquid level in the filter pan 16. An endless drag chain 28 is mounted in trough 27, and chain movement is obtained by the rotation of drive wheel 29, which rotates in a clockwise direction in this embodiment of the invention, so that the lower section of chain 28 moves upwards in trough 27 and the upper section of chain 28 moves downwards in trough 27. An upper drive wheel for chain 28, not shown, is mounted in the upper end of trough 27 and is driven by motor 30 via gear box connection 31. The upwards travel of the lower part of chain 28 within trough 27 serves to displace settled coarse solid particles upwards through the trough 27 from the bottom opening 26 in pan 16, so that coarse wet solids particles are removed from the bottom of pan 16 and passed upwards in trough 27 to upper wet solids outlet 32, which is above the liquid level in trough 27 and pan 16. The wet solids are discharged from outlet 32 as stream 33, which is collected in a suitable vessel such as hopper container 34 and passed to disposal. The collected solids in receiving vessels or hopper containers 34 and 22 may be combined to provide a single stream of separated solids.

Numerous alternatives within the scope of the present invention will occur to those skilled in the art, besides those mentioned supra. Thus, the invention is applicable to various types of vacuum filters besides a rotating drum filter, and is generally applicable to vacuum filters which treat a slurry or sludge containing entrained solids which tend to settle out in the filter unit and plug up the apparatus. The agitators such as units 14 or 25 may be omitted in some instances, such as when the heavy solids settle freely without bridging or buildup along the walls of the filter pan or lower container, and in some cases, other functionally equivalent devices such as internal wall scrapers may be provided instead of or in addition to the agitators 14 and 25. The drive wheels 29 may alternatively rotate in a counter-clockwise direction, in which case the settled solids would be displaced upwards in trough 27 on the upper section of chain 28, while the lower section of chain 28 would move downwards in trough 27. Other alternative means for moving settled solids upwards in troughs 8 or 27, such as a bucket conveyor or bladed trough scraper, may be provided instead of the screw conveyor 9 or drag chain 28.

What is claimed is:

1. An apparatus for separating coarse and fine entrained solid particles from a liquid slurry which comprises a vacuum drum filter, said filter having a rotating vacuum drum for liquid discharge and a drum belt for fine solids cake removal, a filter pan below the rotating drum of said filter, means to maintain a liquid level above the bottom of said rotating drum, said pan sloping downwards to a bottom opening for coarse solids removal, means including conduit means to pass said liquid slurry into said filter pan and to settle a portion of the entrained solid particles in said slurry consisting of generally coarse particles towards the bottom of said filter pan, said filter pan being provided with an internal rotating agitator, said agitator rotating within the liquid phase in said sloping filter pan and disposed to prevent accumulated deposition of solids along the sloping walls of said filter pan, an inclined trough, said trough being juxtaposed adjacent to said sloping pan and extending angularly upwards from the bottom opening in said filter pan, said trough terminating above the liquid level in said filter, means within said trough to displace settled coarse solid particles upwards through said trough from said bottom opening in said pan, whereby coarse wet solids particles are removed from the bottom of said pan, and means at the upper end of said trough to remove the upwardly displaced coarse solids from said trough.

2. The apparatus of claim 1, in which said means within said trough to displace settled coarse solid particles upwards through said trough comprises a rotating screw conveyor, said screw conveyor extending from said bottom opening in said pan to a discharge outlet at the upper end of said trough for disposal of coarse solids.

3. The apparatus of claim 1, in which said means within said trough to displace settled coarse solid particles upwards through said trough comprises a drag chain, said drag chain extending from said bottom opening in said pan to a discharge outlet at the upper end of said trough for disposal of coarse solids.

References Cited

UNITED STATES PATENTS

| 3,238,126 | 3/1966 | Levendusky et al. | 210—404 |
| 3,332,556 | 7/1967 | Hirs | 210—406 |

FOREIGN PATENTS 617,767  2/1961  Italy.

REUBEN FRIEDMAN, Primary Examiner

T. A. GRANGER, Assistant Examiner

U.S. Cl. X.R.

210—408